United States Patent [19]

Matsumoto et al.

[11] Patent Number: 5,137,960
[45] Date of Patent: Aug. 11, 1992

[54] COMPOSITION OF VINYL CHLORIDE BASED RESIN AND ITS MOLDINGS

[75] Inventors: Osamu Matsumoto; Shoichi Yoshizawa, both of Ibaragi, Japan

[73] Assignee: Shin-Etsu Chemical Co., Ltd, Japan

[21] Appl. No.: 702,158

[22] Filed: May 15, 1991

Related U.S. Application Data

[63] Continuation of Ser. No. 361,568, Jun. 5, 1989, abandoned.

[30] Foreign Application Priority Data

Jun. 20, 1988 [JP] Japan .................................. 63-151546
Jul. 7, 1988 [JP] Japan .................................. 63-169270
Jul. 7, 1988 [JP] Japan .................................. 63-169271

[51] Int. Cl.$^5$ .............................................. C08K 3/34
[52] U.S. Cl. ..................................... 524/442; 524/519; 524/569
[58] Field of Search .................... 524/442, 519, 569

[56] References Cited

U.S. PATENT DOCUMENTS

2,174,545  4/1938  Alexander ........................ 524/442
4,021,508  5/1977  Nakanishi ........................ 524/519

*Primary Examiner*—Joseph L. Schofer
*Assistant Examiner*—Peter Mulcahy
*Attorney, Agent, or Firm*—Parkhurst, Wendel & Rossi

[57] ABSTRACT

A vinyl chloride based resin composition including (a) 100 parts by weight of at least one member of resin selected from; a vinyl chloride polymer or vinyl chloride based copolymer whose mean degree of polymerization is 500 to 1000; and a vinyl chloride based copolymer, of which an insoluble part in tetrahydrofuran is 1 to 50 parts by weight, a swelling value in tetrahydrofuran is at least 5.0 and a mean degree of polymerization of a soluble part in tetrahydrofuran is 500 to 1500, which is a copolymer of vinyl chloride monomers and monomers having at least 2 ethylenic double bonds in a molecule. The resin composition also includes (b) 1 to 30 parts by weight of a paste resin of a vinyl chloride polymer or vinyl chloride copolymer whose mean grain size is 2 μm or less and mean degree of polymerization is 500 to 2000. The resin composition further includes (c) 30 to 200 parts by weight of a plasticizer and (d) 0.1 to 30 parts by weight of a water-containing silicic acid or silicic anhydride whose mean grain size is 5 μm or less and has excellent powder fluidity characteristics (workability), when repeatedly heated. The moldings obtained by power slush molding of this resin compound are remarkably improved in their dull finishing characteristics and resistance to heat distortion.

6 Claims, No Drawings

COMPOSITION OF VINYL CHLORIDE BASED RESIN AND ITS MOLDINGS

This is a continuation of application Ser. No. 07/361,568 filed Jun. 5, 1989, now abandoned.

BACKGROUND OF THE INVENTION

This invention relates to a composition of a vinyl chloride based resin which is excellent in fluidity characteristics as fine particles specifically required in slush molding of powder and therefore is of extremely high industrial value. The present invention relates also to moldings that have better surface dull finishing characteristics and resistance to heat distortion than conventional compositions.

In recent years, the demand for powder slush moldings of vinyl chloride based resin has rapidly increased. The powder slush molding consists of sintering, along the entire inner face of desired molds, synthetic resin to form it into a fused monoblock. The synthetic resin composition used in this molding method is required to have excellent powder fluidity as recovered after once being heated. In this molding method, the heated excessive resin composition is recovered and then reused in the following molding process. The resin is thus heated repeatedly, and consequently, each time it is heated its grain size becomes larger, which has been considered an impediment to its powder fluidity characteristics.

Though there are many uses of moldings that are required to have a high-quality aspect without surface luster and to be very resistant to heat distortion, these characteristics are in most practical cases yet insufficient. It should be noted specifically that the dull finishing process now in use is achieved by applying a minute dappled pattern on the inner face of the forming mold. As this mold is repeatedly used, the inner face thereof is deteriorated, thereby reducing the full finishing quality of the molding surface. The pattern application also causes higher production costs.

SUMMARY OF THE INVENTION

An object of this invention is to obtain a vinyl chloride resin composition that does not deteriorate, when slush molding the powder, the fluidity characteristics thereof even if the heated excessive composition is repeatedly used.

Another object of the invention is to obtain such vinyl chloride resin composition as may endow the moldings, when powder slush molding, with excellent characteristics of surface dull finishing without being dependent [depending] upon the molds.

A further object of this invention is to obtain powder slush moldings composed of such vinyl chloride resin composition as having excellent surface dull finishing and resistance to heat distortion.

As a result of our researches to eliminate the disadvantages as above and to have the foregoing excellent characteristics, we eventually accomplished the present invention.

A subject matter of this invention is a vinyl chloride based resin composition which includes: (a) 100 parts by weight of at least one member of resin selected from vinyl chloride polymer or vinyl chloride based copolymer whose mean degree of polymerization is 500 to 1000 and vinyl chloride based copolymer, of which an insoluble part in tetrahydrofuran is 1 to 50 parts by weight, swelling value in tetrahydrofuran is at least 5.0 and mean degree of polymerization of a soluble part in tetrahydrofuran is 500 to 1500, which is a copolymer of vinyl chloride monomers and monomers having at least 2 ethylenic double bonds in a molecule. The resin composition also includes (b) 1 to 30 parts by weight of paste resin of a vinyl chloride polymer or vinyl chloride copolymer whose mean grain size is 2 $\mu$m or less and mean degrees of polymerization is 500 to 2000. Furthermore, the resin composition includes (c) 30 to 200 parts by weight of a plasticizer and (d) 0.1 to 30 parts by weight of water-containing silicic acid or silicic anhydride whose mean grain size is 5 $\mu$m or less.

Another subject matter of this invention is powder slush moldings composed of the vinyl chloride base resin composition.

The composition of vinyl chloride resin according to this invention has excellent powder fluidity characteristics (workability) when repeatedly heated. The value of industrial use of this composition is extremely high because when slush molding its powder it substantially improves such characteristics as dull finishing and resistance to heat distortion of its moldings.

The moldings obtained from this resin composition are of great use as, for instance, automobile interior finishes, specifically instrument panels, meter boxes, console boxes, door trims, crush pads, head rests, arm rests, glove boxes, shift knobs and so forth.

DETAILED EXPLANATION OF THE INVENTION

The vinyl chloride polymer or vinyl chloride based resin to be used as the component (a) above in the resin composition of this invention, whose mean degree of polymerization is 500 to 1000, can be obtained by, for instance, bulk or suspension polymerization of a vinyl chloride monomer, to which is added such another monomer that can, as required, be copolymerized therewith as; vinyl acetate, ethylene, propylene, vinylidenechloride, acrylonitrile and other acrylic monomers.

The resin with less than 500 of mean degree of polymerization is not desirable because required physical characteristics such as tensile and tear strength cannot be met, while those with a mean degree of polymerization of 1000 or more are not desirable since their workability is considerably reduced.

The vinyl chloride based copolymer to be used as the other one of component (a), has an insoluble part in tetrahydrofuran which is at least 5.0 and a mean degree of polymerization of a soluble part in tetrahydrofuran of 500 to 1500. This copolymer can be obtained by copolymerization of a vinyl chloride monomer with a compound having at least 2 ethylenic double bonds in its molecule. This copolymer can be used as a mixture with one or more substances. The compound with ethylenic double bonds is diene based, having plural ethylenic double bonds in a molecule with relatively low molecular weight. The copolymers thereof are enumerated, but not limited to the following: 1,4-trans-butadiene polymer, 1,4-cis-butadiene polymer, 1,2-butadiene polymer, $\alpha,\omega$-polybutadiene carboxylic acid with the terminal group of polybutadiene substituted, 1,4-trans-isoprene homopolymer, 1,4-cis-isoprene homopolymer, chloroprene homopolymer, styrene-butadiene copolymer, acrilonitrile-butadiene copolymer. As other compounds having ethylenic double bonds, the following are used; polyfunctional monomer compounds, for example such diallyl esters as diallyl phthalate, diallyl malate, diallyl adipate, such di- or tri-(metha) acrylic esters as ethylene glycol diacrylate, trimethylolpropane triacrylate, and triallyl cyanurate, divinylbenzene, ethylidene norbornene, dicyclopentadiene, vinyl methacrylate, vinyl crotonate and divinyl adipate.

The copolymerization can be made by bulk or suspension polymerization where, in addition to the monomers for copolymerization, such other monomers can be combinedly used in limited quantity as: vinyl acetate, ethylene, propylene, vinylidene chloride, acrylonitrile and other acrylic monomers.

A preferable copolymerization ratio of the compounds having ethylenic double bonds with vinyl chloride can be refined individually depending on the types of the compounds having ethylenic double bonds. The preferable ratio is 0.1 to 10 parts by weight per 100 parts by weight of the vinyl chloride monomer and the other monomers.

Any copolymers produced should meet the above-mentioned conditions that the insoluble part in tetrahydrofuran should be 1 to 50 percent by weight, the swelling value should be not less than 5, and a mean degree of polymerization of a soluble part in tetrahydrofuran should be 500 to 1500. If the weight percentage of the insoluble part in tetrahydrofuran is less than 1%, the powder fluidity when molding, dull finishing characteristics of moldings nor their resistance to heat distortion can not be greatly improved. If, however, this same percentage exceeds 50% in weight, then the workability will be reduced thereby making molding difficult. The improvement effect is small in powder fluidity when molding, dull finishing of moldings and in resistance to heat distortion if the swelling multiplication as against tetrahydrofuran is less than 5.

If the mean degree of polymerization of the soluble part in tetrahydrofuran is less than 500, the moldings thereof lack required mechanical strength of tension, tearing or the like. If the same degree, however, exceeds 1500, moldability thereof decreases.

The insoluble part ratio (or soluble part ratio) in tetrahydrofuran the swelling value, and the mean degree of polymerization were defined by such values as measured below.

The Swelling Value in Tetrahydrofuran 1 g of a sample was put into a color comparison tube (100 ml) into which 80 ml of tetrahydrofuran was added, and these were fully shaken under a normal temperature. This color comparison tube was then put into a water bath at 75° to 85° C. and shaken under heat for 5 minutes. Then the tube was cooled to normal temperature and tetrahydrofuran was added thereto up to a marked line thereof, and wholely shaken again. After incubating the tubes overnight, the volume of insoluble residue in tetrahydrofuran was read, and the resultant value thereof was divided by the apparent volume of the resin before adding to tetrahydrofuran. The value obtained as a result was taken as the swelling index or multiplication.

THE INSOLUBLE (OR SOLUBLE) PART RATIO

The supernatant liquid was extracted with 10 ml by a pipet, and then tetrahydrofuran was dried and removed. The resin content was precisely weighed (W), and 10 times the value thereof was divided by the initial sample volume of 1 g. 100 times of the quotient thereof was then adopted as the tetrahydrofuran soluble $$\left( i.e., \frac{10\ W\ (g)}{\text{sample 1 (g)}} \times 100\% \right).$$

The volume of the insoluble part was calculated by the following formula:

$$\left[ 1 - \frac{10W\ (g)}{\text{sample 1(g)}} \right] \times 100\%$$

The Mean Degree of Polymerization

The above mentioned supernatant liquid was extracted with 10 ml by a pipet, and a small volume of pure water and dilute hydrochloric acid were added thereto. The liquid was boiled and then cooled. The deposit from the liquid was filtered by a glass filter and a residue thereof was obtained. The residue (vinyl chloride based copolymer) was dried at 105° C. for 8 hours. $200 \pm 1$ mg of this sample was dissolved in nitrobenzene and the solution was filled to 50 ml as a whole with the solvent. This solution was provided as the testing solution. Viscosity of the testing solution was measured by an Ubbelohode type viscometer.

A limiting viscosity was calculated from a specific viscosity $\eta$ sp and a relative viscosity $\eta$ rel by the following formula:

$$[\eta] = \frac{\sqrt{2}}{c} \sqrt{\eta\ sp - \log_e \eta\ rel}$$

Then the mean degree (p̄) of polymerization was calculated from the limiting viscosity by the following formula:

$$p = 500 \left\{ \text{antilog}_{10} \frac{[\eta]}{0.168} - 1 \right\}$$

The vinyl chloride based paste resin as the component (b) can be prepared by emulsion copolymerization and solution copolymerization whose mean degree of copolymerization is 500 to 2000 and mean grain size is 2 $\mu$m or less. The range of this mean degree of polymerization is limited by the same reason as in the case of the resin as component (a) above. The resin whose mean grain size exceeds 2 $\mu$m is not suitable because its powder fluidity cannot be improved. The vinyl chloride based paste resin may combinedly use, when polymerized, a small quantity of such monomers as copolymerizable with the vinyl chloride monomers.

Any plasticizer that has conventionally been used in manufacturing of plasticized moldings of vinyl chloride resins may be used as a component (c). Some examples thereof are; such phthalic esters as dibutyl phthalate, di(2-ethylhexyl) phthalate; alkyl esters of aliphatic polybasic acids such as dioctyl adipate, dioctyl sebacate; such alkyl phosphate esters as tricresylphosphate; and other lower polymer polyesters.

There is no limitation with regard to the water-containing silicic acid or silicic anhydride as the component (d) and any with a mean grain size of 5 $\mu$m or less that is available in markets may serve as such. If, however, its mean grain size exceeds 5 $\mu$m, the dispersion characteristics thereof are worsened and outer aspect deteriorated. Moreover, no powder fluidity characteristics can be expected therefrom when it is heated.

The composition of the vinyl chloride based resin by this invention is composed mainly of the five components (a) through (d) above.

The loadings of these components should be 100 parts by weight of the vinyl chloride based resin as component (a): 1 to 30 parts (more preferably 5 to 15 parts) by weight of the vinyl chloride based paste resin as component (b): 30 to 150 (more preferably 50 to 100 parts) by weight of plasticizer as component (c), and 0.1 to 30 parts (more preferably 0.5 to 11 parts) by weight of water-containing silicic acid or silicic anhydride as component (d), repsectively.

If the component (b) is less than 1 part by weight, workability worsens with much more stickiness, and if on the contrary it is more then 30 parts by weight, the economy of this component is reduced. On the other hand less than 30 parts by weight of the component (c) is not desirable because it causes reduction of hardness and such other physical properties as tensile and tear strength. When 150 parts by weight is surpassed, its powder fluidity characteristics are markedly reduced, thereby making working much more difficult. When the component (d) is less than 0.1 parts by weight, the effect of this invention cannot be obtained, and if it exceeds 30 parts by weight, then such physical properties as hardness, tensile and tear strength will undesirably worsen.

To the composition of this invention we can add, as necessity dictates, stabilizers, lubricants, mold release agents, fillers, coloring agents, antioxidants, ultraviolet absorbing agents and a wide variety of additives.

EXAMPLES OF THE INVENTION

The following working examples include preferred embodiments to illustrate the invention. It is, however, to be understood that the invention is not intended to be limited to the specific embodiments.

Using such materials as below, we prepared 8 samples of mixtures as shown in working examples 1 to 8 of the Table.

Vinyl Chloride Polymers [Based Copolymers]

TK-700 (insoluble part in tetrahydrofuran being 0 weight %; swelling value in tetrahydrofuran being ∞; mean degree of polymerization being 680; made by SHIN-ETSU Chemical Co., LTD.)

TK-800 (insoluble part in tetrahydrofuran being 0 weight %; swelling value in tetrahydrofuran being ∞; mean degree of polymerization being 830; made by SHIN-ETSU Chemical Co., Ltd.)

GR-800 (insoluble part in tetrahydrofuran being 20 weight %; swelling value in tetrahydrofuran being 5.0; mean degree of polymerization being 760, made by SHIN-ETSU Chemical Co., Ltd.)

GR-1300 (insoluble part in tetrahydrofuran being 25 weight %; swelling value in tetrahydrofuran being 15.0; mean degree of polymerization being 1100; made by SHIN-ETSU Chemical Co., Ltd.)

These vinyl chloride based copolymers, TK-700, TK-800, GR-800 and GR-1300 were made by bulk polymerization.

Vinyl Chloride Based Paste Resin

P-410 (mean grain size being 1 $\mu$m or less; mean degree of polymerization being 1500; made by Mitsubishi Chemical Industry Co., Ltd.)

Plasticizer

DL-911P (mixture of phthalic ester based; made by Shell Chemical Inc.)

Stabilizer

Epoxidized soybean oil
Barium/zinc based stabilizer

Silicic Acid

Thyroid #74 (mean grain size being 4 $\mu$m; made by Fuji Devision Chemical Co., Ltd.)

Aerozyl 200 (mean grain size being 12 $\mu$m; made by Nihon-Aerozyl Co., Ltd.)

A sample of a vinyl chloride based resin composition was provided below:

Vinyl chloride based resin and barium/zinc based stabilizer were mixed and stirred by a "Hensil Super-mixer" under heating. When heated to 80° C., epoxidized soybean oil and a half volume of plasticizer DL-911P were added thereinto and were continuously stirred. When heated to 100° C., the other half volume of plasticizer DL-911P was added. These were stirred and heated to 120° C. Then the mixture was cooled by water. Cooled under 40° C., vinyl chloride based paste resin and silicic acid were added and stirred. The mixture thus treated was passed through a JIS 40 mesh sieve to have respective compositions of powder compounds.

A sample of the vinyl chloride based resin composition was provided to be evaluated for the powder fluidity characteristics and workability in accordance with the following method. Further, after coating these compositions of about 2 mm of thickness onto steel plates, they were transferred into a reheating furnace with a temperature adjusted constant and sintered therein for 2 minutes. The dull finishing characteristics and resistance to heat distortion of the sheets thus obtained were evaluated according to the following method, the results of which have been indicated in tabular form hereafter.

Powder Fluidity Characteristic of the Compounds

Under the conditions and respective temperature as below, the fluidity was measured using a bulk density measuring device. In this testing method 100 ml of composition as obtained by the bulk density measurement was left to fall and the falling time thereof was measured three times. The mean values of these three falls, which were obtained are also indicated in tabular form.

Condition I: After preparing the compound, it was incubated for 24 hours under conditions of constant [temperatere] temperature at 20°±2° C. and constant humidity at 60±2% and then measured.

Condition II: The residual 200 g of the compound left as not reacted under Condition I was spread over an aluminum vat, then incubated under the conditions of constant temperature at 20°±2° C. and constant humidity at 60±2% for 24 hours. After incubating this for 4 minutes in an oven heated up to 140° C., it was then cooled down below room temperature for 30 minutes, and then measured.

Condition III: After recovering the residual compound left as not dealt with by Condition II, it was incubated for 4 minutes in an oven heated to 140° C. It was cooled down below room temperature for 30 minutes, and then measured.

Condition IV: After recovering the residual compound by Condition III, it was dealt with by the same treatment as Condition III and then measured.

Condition V: After recovering the residual compound as left from Condition V, it was dealt with by the treatment same as Condition III and then measured.

Condition VI: After recovering the residual compound as left from [ConditionV] Condition V, it was dealt with by the treatment same as Condition III and then measured.

Providing Sample Sheets to be Evaluated

Each compound obtained under the Condition I and IV was spread on a steel plate heated at 210° C. The steel plate, which had the area of 25 cm×15 cm and had 2 mm thickness, was finished by sandblasting. After the compound on the hot steel plate was kept there for 20 seconds, unmelted compound was taken off, then the melted compound on the steel plate was put into a furnace heated at 300° C. and was kept therein for 50 seconds. A sheet molding of the compound was shaped by the above working. The sheet on the steel plate was suddenly cooled in water and was removed from the steel plate.

These sample sheets having the area of 25 cm × 15 cm were prepared by the above-mentioned method and were evaluated for thickness uniformity, surface voids and defects of the back side as workability of the compound. The sample sheets were also evaluated for dull finish characteristics and resistance to heat distortion.

Workability of the Compound

The thicknesses of the sample sheets were measured at the center and at four middle points in each four corners from the center. Thicknesses of the five points in total were thus measured. A difference of the maximum thickness and the minimum one at the five points on each sheet of compounds under the condition I and IV, being less than 1 mm, was marked score 2. The difference of 1 mm to 2 was marked score 1. The difference of more than 2 mm was marked score 0. A difference of an average of thicknesses at five points of a sample sheet under the condition I and average of thicknesses at five points of a sample sheet under the condition IV, being less than 0.3 mm, was marked score 1. A difference of the same more than 0.3 mm was marked score 0. Further, sample sheets under the condition IV, having neither a surface void nor a hard sport, was marked score 2. The sheets having at least one of a void or spot was marked score 0. The total score of the all above mentioned scores was evaluated as workability of the compound.

Dull Finish Characteristics

In order to evaluate dull finish characteristics of sample sheets, reflectance of a surface contacted to a steel plate thereof was measured at 75 degrees of reflection by a reflecting photometer (made by Nihon Densyoku Co., Ltd.). A reflectance of a sheet of Example 8 under condition I was 68%. A reflectance increase of another sample sheet under Condition VI was compared with the reflectance. When reflectance increased less than 10%, dull finish characteristics was marked score 0. When increasing 10 to 20%, dull finish characteristics was marked score 1. When increasing 20 to 30%, dull finish characteristics was marked score 2. When increasing more then 30%, dull finish characteristics was marked score 3.

Resistance to Heat Distortion

Urethane foams of 10 mm in thickness were backed onto the sintered sample sheets, from which 25 cm×15 cm of 4 test pieces were prepared. Reference lines were drawn parallel to the side lines on the surface of sample sheets on test pieces at 10 mm inside from each edge. The distances between two parallel lines were precisely measured at least at 4 points and means values lengthwise and breadthwise thereof were obtained as original dimenspectively, at 120° C., they were incubated for 1 hour under room temperature. At least at 4 points the distances between 2 parallel lines were again measured precisely and mean values thereof were obtained both lengthwise and breadthwise. The results thereof were compared with the original dimensions. The difference of the mean value and the original dimension were held as values of heat distortion. Those with less than 1% of that mean distortion were assessed as "good", those with 1% or more as "bad".

TABLE

|  | Examples | | | | | | | |
|---|---|---|---|---|---|---|---|---|
|  | 1 | 2 | 3 | 4 | 5 | 6 | 7 | 8 |
| Contents of the compound | | | | | | | | |
| Vinyl chloride polymers: | | | | | | | | |
| TK-700 | 100 | 0 | 90 | 50 | 0 | 0 | 100 | 100 |
| TK-800 | 0 | 100 | 0 | 0 | 0 | 0 | 0 | 0 |
| Vinyl chloride based copolymers: | | | | | | | | |
| GR-800 | 0 | 0 | 0 | 0 | 100 | 0 | 0 | 0 |
| GR-1300 | 0 | 0 | 10 | 50 | 0 | 100 | 0 | 0 |
| Vinyl chloride based paste resin: P-410 | 11 | 11 | 11 | 11 | 11 | 11 | 11 | 11 |
| Plasticizer: DL-911P | 72 | 72 | 72 | 72 | 72 | 72 | 72 | 72 |
| Stabilizer: | | | | | | | | |
| Epoxidized soybean oil | 5.5 | 5.5 | 5.5 | 5.5 | 5.5 | 5.5 | 5.5 | 5.5 |
| Ba/Zn based | 10.7 | 10.7 | 10.7 | 10.7 | 10.7 | 10.7 | 10.7 | 10.7 |
| Silicic acid: | | | | | | | | |
| Thyroid #74 | 0.1 | 0.55 | 0.3 | 10.0 | 0.1 | 0 | 0 | 0 |
| Aerozyl 200 | 0 | 0 | 0.25 | 0 | 0 | 0.1 | 10.0 | 0 |
| Testing results | | | | | | | | |
| Powder fluidity characteristic (sec.): | | | | | | | | |
| Condition I | 13.2 | 14.8 | 13.5 | 15.3 | 19.2 | 19.5 | 15.0 | 13.0 |

TABLE-continued

|  | Examples | | | | | | | |
| --- | --- | --- | --- | --- | --- | --- | --- | --- |
|  | 1 | 2 | 3 | 4 | 5 | 6 | 7 | 8 |
|  | (weight %) | | | | | | | |
| II | 13.5 | 14.2 | 13.1 | 14.4 | 18.4 | 19.2 | 14.1 | 14.3 |
| III | 14.2 | 13.5 | 12.8 | 14.1 | 18.1 | 18.6 | 13.3 | 15.6 |
| IV | 15.6 | 13.1 | 12.5 | 13.8 | 17.7 | 17.7 | 12.8 | 16.8 |
| V | 16.3 | 13.4 | 12.4 | 13.3 | 17.5 | 17.7 | 12.9 | 17.5 |
| VI | 17.1 | 13.4 | 12.3 | 12.6 | 17.4 | 17.6 | 13.1 | 18.0 |
| Workability of the compound | 6 | 7 | 7 | 6 | 5 | 5 | 5 | 3 |
| Dull finish characteristic | 0 | 0 | 2 | 3 | 3 | 3 | 0 | 0 |
| Resistance to heat distortion | bad | bad | good | good | good | good | bad | bad |

What is claimed is:

1. A vinyl chloride based resin composition for slush molding, comprising:
   (a) 100 parts by weight of a mixture of a vinyl chloride polymer soluble in tetrahydrofuran and a vinyl chloride based copolymer, each of the polymer and the copolymer prepared by bulk or suspension polymerization, wherein the vinyl chloride based copolymer is a copolymer of vinyl chloride and monomers having at least two ethylenic double bonds in a molecule, the vinyl chloride based copolymer having a swelling value of at least 5.0 in tetrahydrofuran and 1 to 50 parts by weight of an insoluble part in tetrahydrofuran, and wherein a mean degree of polymerization for each of the insoluble part of the vinyl chloride polymer and of the vinyl chloride based copolymer is 500 to 1000;
   (b) 1 to 30 parts by weight of a vinyl chloride polymer paste resin or a vinyl chloride copolymer paste resin having a mean grain size of 2 $\mu$m or less and a mean degree of polymerization of 500 to 2000, each resin prepared by emulsion or solution polymerization;
   (c) 30 to 200 parts by weight of a plasticizer; and
   (d) 0.1 to 30 parts by weight of silicic acid or a silicic anhydride having a mean grain size of 5 $\mu$m or less.

2. The vinyl chloride based resin composition of claim 1, wherein for (a) said vinyl chloride polymer is present in an amount of 50 to 90 parts by weight and said vinyl chloride based copolymer is present in an amount of 10 to 50 parts by weight.

3. The vinyl chloride based resin composition of claim 1, wherein said silicic acid or said silicic anhydride is present in an amount of 0.5 to 11 parts by weight.

4. The vinyl chloride based resin composition of claim 1, wherein said plasticizer is present in an amount of 50 to 100 parts by weight.

5. The vinyl chloride based resin composition of claim 1, wherein said paste resin (b) is present in an amount of 5 to 15 parts by weight.

6. The vinyl chloride based resin composition of claim 1, wherein said vinyl chloride based copolymer monomers having at least two ethylenic double bonds in (a) are selected from the group consisting of: $\alpha,\omega$-butadiene glycol, $\alpha,\omega$-butadiene carboxylic acid, 1,4-trans-isoprene, 1,4-cis-isoprene, chloroprene, styrene-butadiene, acrylonitrile-butadiene, 1,4-trans-butadiene, 1,4-cis-butadiene, 1,2-butadiene, diallyl phthalate, diallyl malate, diallyl adipate, ethylene glycol diacrylate, trimethylolpropane triacrylate, triallyl cyanurate, divinylbenzene, dicyclopentadiene, vinyl methacrylate, vinyl crotonate and divinyl adipate.

* * * * *